United States Patent Office 3,532,433
Patented Oct. 6, 1970

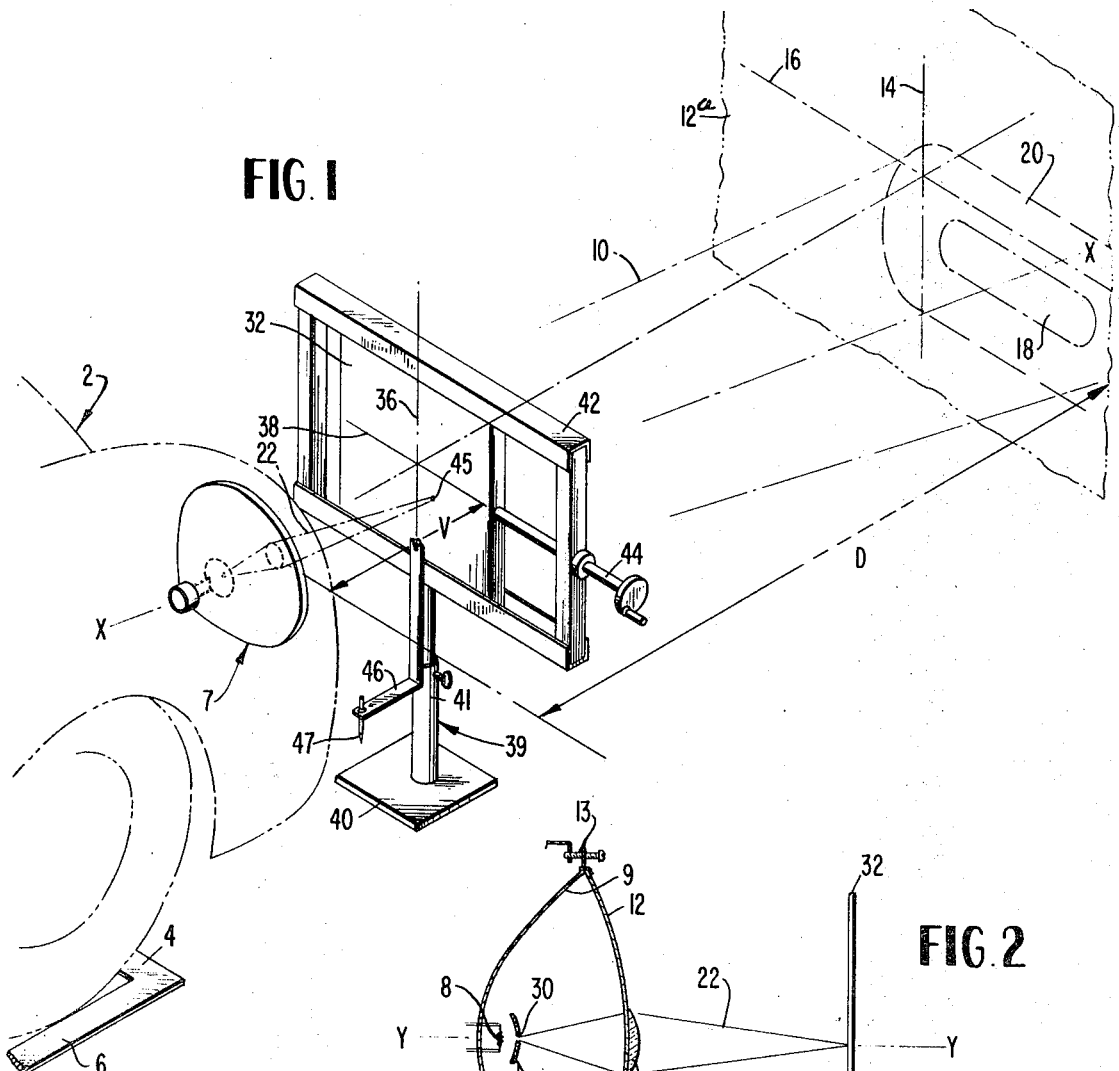
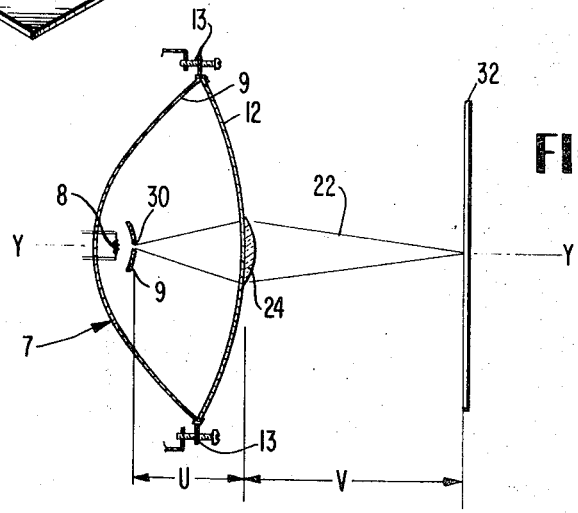
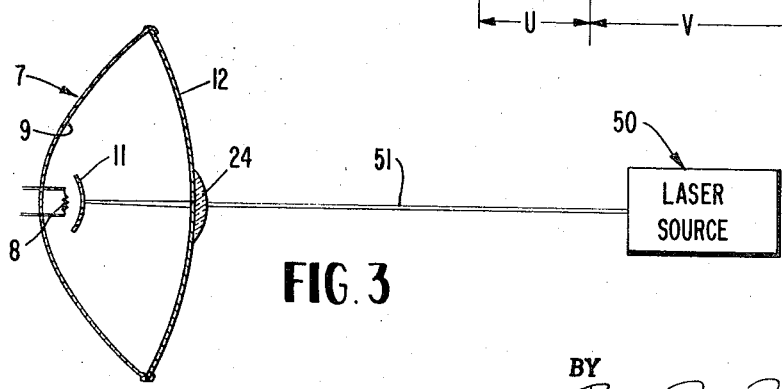

3,532,433
LAMP BEAM AIMING SYSTEM AND METHODS OF CONSTRUCTION AND USE THEREFOR
Evan L. Hopkins and Lee K. Irwin, Emporia, Kans., assignors to Hopkins Manufacturing Corporation, Emporia, Kans., a corporation of Kansas
Filed Sept. 16, 1968, Ser. No. 762,237
Int. Cl. G01j 1/00; F21u 13/04
U.S. Cl. 356—121                                   4 Claims

ABSTRACT OF THE DISCLOSURE

A lamp beam aiming system which is intended to facilitate aiming of a beam produced by the lamp relative to structure supporting the lamp. A converging lens secured to the lamp converges a minor portion of the light in the main beam into an aligning beam focused to a point spaced relatively close to the lamp. The aligning beam directs an image on a screen which is so positioned in relation to the supporting structure that the main beam is aligned in predetermined relation to the lamp supporting structure when the image is located at a predetermined point on the screen.

To provide a target image for the aligning beam a thin opaque barrier is interposed between the converging lens and the light source of the lamp. A pin point opening in the barrier to provide the target is produced in an initial stage of manufacture by directing a laser beam back along a path aligned with the main beam axis to perforate the barrier.

BACKGROUND OF INVENTION

This invention relates to a lamp in which a main light beam produced by the lamp may be readily aligned in relation to adjacent structure (such as a motor vehicle structure) supporting the lamp. Additionally, the invention relates to methods of construction and use of a lamp which is particularly suitable for use in applications requiring correct alignment of the lamp beam.

In aligning an automobile head lamp to direct a beam of light along a predetermined path relative to the automobile, it is common to follow lighting standards promulgated by the Society of Automotive Engineers. These standards are, for example, discussed on pages 759–761 of the 1968 edition of the Handbook Supplement 34, Lighting Equipment and Photometric Tests, published by the Society of Automotive Engineers, Inc., New York, N.Y. In that publication the position which the high intensity zone of an illuminated area, particularly a main head lamp beam of an automobile upon a screen fixed 25 feet ahead of the automobile should occupy, is defined.

In checking whether a vehicle meets the lighting standards, certain problems may often arise. For example, if a simple screen installation of the type just discussed is actually used, it will be found that the beam image produced on the screen at 25 feet often tends to be very diffuse in respect to its brightest and less bright zones, particularly when the test is conducted in daylight. In these circumstances, it may be very difficult by direct visual observation to align the high intensity zone of the head lamp beam at the correct position on the screen.

An alternative system of alignment intended to obviate this problem, has provided for the use of a housing movable vertically and horizontally before the automobile and provided with a converging lens adapted to be spaced before the vehicle head lamp to converge the main beam onto an aiming screen carried by the housing. Installations of this type, though widely used, generally require fairly costly supporting equipment for vertical and horizontal motion of the housing and require trained personnel for their operation. As a result, such installations are frequently unsuitable for use in service stations having an insufficient volume of head light testing work to justify incurring the relatively high capital cost of an installation of this type or the costs of training personnel in their use.

It would, therefore, be desirable to devise an alternative system in which the testing equipment required to be owned by a service station or other testing installation could be held to a minimum both to reduce cost and to obviate the need for special training. One such alternative system would provide alignment means as a permanent modification to the head lamp, so that the head lamp may thereafter be aligned by rudimentary processes at the service station involving the use of the aligning provision on the lamp made by the manufacturer.

For example, it has been known to provide glass projections on the usual front glass of a head lamp so that projections may thereafter be mechanically set against various types of mechanical gauge. However, this type of system is not entirely satisfactory as manufacturing tolerances are such that the optical properties of various lamps having the same external mechanical configuration may vary considerably.

It would, therefore, be preferable to provide an optical alignment system permanently associated with the lamp as a modification thereto, which could be directly associated with the particular optical characteristics of the lamp. However, modifying sealed beam lamp units commonly in automobile use to provide such an optical alignment system has hitherto proved unachievable due to the difficulty of gaining access to the interior of the lamp to modify the optical structure once the lamp has been manufactured.

OBJECTS AND SUMMARY OF INVENTION

It is, therefore, a general object of the invention to provide a lamp beam aiming system intended to obviate or minimize problems of the type previously noted.

It is a particular object of the invention to provide a system for aligning the beam of an automobile lamp, which requires only very simple testing equipment to be provided at a location where testing is to be carried out, thereby minimizing the capital outlay required and obviating the need for highly trained testing personnel.

It is another object of the invention to provide an alignment system for a lamp involving the provision of aligning structure as a permanent modification to the lamp, wherein the aligning structure provided for each lamp is intimately related to the particular optical characteristics of that lamp.

A method aspect of the invention intended to accomplish at least some of the foregoing objects, is intended for aligning a beam of a lamp. The lamp is adjustably mounted on lamp supporting structure and has a directional main beam of light diverging gradually along a main beam axis. The method includes an initial step of connecting a converging lens with the lamp to extend into the main beam to cause a minor portion thereof to be focused into an aligning beam within the main beam at a predetermined relative inclination thereto. The focal length of the converging lens is arranged to be sufficiently short to cause the aligning beam to converge to a point spaced relatively close to the lamp. The supporting structure is positioned before a screen with the lamp at a spacing from the screen generally equal to the distance of convergence of the aligning beam so that the aligning beam produces an aligning image on the screen. The screen and the supporting structure are arranged in such relation to each other that when the aligning beam image occupies a predetermined location on the screen, the main beam will be aimed along a predetermined desired path from the lamp supporting structure. In a final step, the lamp is moved relative to the lamp supporting structure until the image produced by the aligning beam moves to the predetermined location on the screen.

In one application of this system, a small converging lens is secured to the front glass of an automobile head lamp. The convering lens focuses a small portion of the main beam into an aligning beam converging to a point relatively close the the lamp. The automobile is positioned before an aligning screen provided at a testing station so that the aligning beam casts an image on the screen. The automobile is initially located relative to the aligning screen in such relation that when the aligning beam image is at a particular predetermined location on the aligning screen, then the main beam will be correctly aligned. Finally, the lamp is adjusted relative to the automobile to move the image to the predetermined location on the screen. It will be readily appreciated that this system requires the testing station owner to invest in only very simple equipment comprising a simple aligning screen together with suitable locating points on the ground for locating the car in predetermined relation to the screen. Thus, the capital outlay required from the testing station owner is minimized and at the same time the operations to be performed during testing are very much simplified.

Another method aspect of the invention resides in the manner in which a precisely located target image is provided for the converging lens secured to the lamp. Each lamp provided is of the type having a light source positioned in front of a directional light reflector for reflecting light from the source out along a main beam extending in a forward direction along the main beam axis. An opaque barrier is provided in the lamp for preventing direct passage of light from the lamp to the converging lens. The lamp is placed before a source of laser light which directs a laser beam back along the main beam axis centrally through the converging lens. The laser beam produces a pin point opening in the barrier.

Thereafter, the pin point opening with the light source behind it, functions as a target image for the converging lens so that the converging lens may thereafter produce the image on the aligning screen.

It will be appreciated that by the use of a laser beam, it is possible to produce an aperture in the opaque barrier at the exactly correct location in the barrier necessary to cause the aligning beam to be aligned in predetermined relation to the main beam axis, even though it is not possible to gain direct access to the interior of the lamp to mechanically produce the pin point aperture.

THE DRAWINGS

A lamp beam aligning system according to a preferred embodiment of the invention is illustrated in the accompanying drawings in which, FIG. 1 is a simplified perspective view showing a lamp beam aligning system according to one preferred embodiment of the invention;

FIG. 2 is a cross-sectional side view of the lamp shown in FIG. 1 subsequent to production of an opening in an opaque barrier within the lamp, showing the use of the opening as a target for the lens; and FIG. 3 is a simplified cross-sectional side view showing one method step in the production of the pin point opening in the opaque barrier.

DETAILED DESCRIPTION

Referring to FIG. 1 of the drawings, an aligning system according to a preferred embodiment of the invention is there shown. An automobile 2 of conventional construction is positioned on a horizontal ground surface with its front wheels in alignment with transverse and longitudinal marking lines 4 and 6, respectively, on the ground. The automobile is provided with a front head lamp 7 mounted in a front wing of the automobile facing forwardly thereof.

The head lamp 7 (FIG. 2) is of the conventional sealed beam type and includes a light source in the form of a bulb 8 spaced within a forwardly curved reflecting surface 9 of the lamp. The reflector 9 is shaped to reflect rays from the light bulb 8 and project them in a main beam 10 extending forwardly from the lamp along a main beam axis X—X with the light rays in the beam diverging gradually away from the lamp. An opaque curved barrier 11 of metal foil connected with the bulb is positioned adjacent the forward end of the lamp to cause light rays leaving the bulb filament in a forward direction to be reflected back against the reflector 9 to be reflected thereby along the main beam 10. Alternatively, the barrier 11 may be provided as an opaque silver coating on the forward peripheral surface of the bulb 8, or in other conventional ways. A plain, non-focusing, transparent front glass 12 fixedly connected with the lamp 7 extending across the open end of the reflector, cooperates with the remainder of the lamp structure to provide a sealed enclosure about the reflector end bulb. A conventional mounting 13 between the lamp and the adjacent automobile structure enables the head lamp 7 to be adjusted in vertical and transverse inclination relative to the automobile for beam alignment purposes.

It is desirable for proper illumination, to mount the head lamp 7 on the automobile 2 in such relation that the main beam 10 of the lamp 7 is directed along a path defined by the standards of the aforementioned publication of the Society of Automotive Engineers. This standard may be illustrated in the present instance with reference to a vertical, flat, transverse screen 12a (FIG. 1) spaced a standard distance D (25 feet according to the standards) in front of the head lamp, with the screen 12a having vertical and horizontal center lines 14 and 16 aligned with corresponding vertical and horizontal median planes of the lamp. The beam 10 of the lamp produces an illuminated area on the screen having zones 18 and 20 of high and low intensity, respectively. To meet the required lighting standard, the head lamp is adjusted vertically and laterally relative to the adjacent vehicle structure until the high intensity zone 18 occupies a defined location on the screen 12a in relation to the center lines 14 and 16.

It will be appreciated that an actual head light alignment operation performed in this way would tie up a considerable amount of space which might not be available in many service stations. In addition, the lamp beam at 25 feet has often become so diffused between the high and low intensity zones that visual observation of the boundaries of the high intensity zone for alignment thereof on the screen, may be extremely difficult.

The present invention which is intended to obviate these problems, utilizes an aligning beam 22 focused by a small converging lens 24 (FIG. 2) secured to the front glass 12 of the lamp 7. Suitable transparent adhesive is utilized to effect connection. The converging lens 24 is positioned generally at the center of the front glass 12 and occupies only a very minor portion of the total area of the front glass.

To provide a target image for the converging lens 24, a pin point aperture 30 is provided in the barrier 11, in a manner to be described hereinafter. The pin point opening 30 functions as a point source of light to provide a target for the converging lens 24 which focuses the light to form the previously mentioned aligning beam 22. The spacing $u$ of the aperture 30 from the lens 24 is greater than the focal length of the lens to ensure that the aligning beam converges forwardly from the lamp. The relative angular positions of the lens 25 and the pin point aperture 30 are such that the aligning beam extends along an axis Y—Y which is aligned precisely with the axis X—X of the main beam. In addition, the focal length of the lens 24 is chosen to be sufficiently short for the aligning beam to converge to a point spaced a distance $v$ from the lamp which is considerably smaller than the lamp-to-screen distance D of the standards previously discussed.

As an example, the distance within the lamp $u$ between the aperture 30 and the lens 24 may be 4″ for a typical sealed beam lamp unit. It may be desired to provide a spacing $v$ of 40″ between the lens 24 and the screen 42 to allow reasonable clearance between the screen and the front portions of the automobile. With these figures the focal length of the lens 24 to provide a focused image at the screen may be calculated utilizing the well-known lensmaker's formula:

$$\frac{1}{u}+\frac{1}{v}=\frac{1}{f}$$

Applying this formula, the lens 24 should have a focal length of $3\frac{7}{11}″$. It will be realized, however, that these figures are merely exemplary and other values may equally be chosen.

Referring to FIG. 1, the aligning beam 22 is directed onto the surface of an aligning screen 32 positioned at generally the point of convergence of the aligning beam 22. The aligning screen 32 which includes vertical and horizontal center lines 36 and 38, respectively, is supported in vertical and transversely extending disposition by a support unit 39. The support unit 39 may include a base 40 resting on the ground, a vertically adjustable, telescoping column 41 and a horizontal top track 42 supporting the aligning screen 32 for horizontal, transverse sliding motion subject to the action of a transverse adjusting screw 44 connected with the track. A probe 46 carried by the aligning screen 32 may be swung upwardly from a downward, inactive position to a horizontal position in which a free rearward end 47 of the probe is aligned longitudinally with the cross point of the vertical and horizontal center lines 36 and 38. Appropriate vertical and transverse adjustments of the stand and the screen are made to bring the probe 46 into touching engagement with the center of the lamp to align the vertical and horizontal median planes thereof with the vertical and horizontal center lines 36 and 38 of the screen 32. Although a particular supporting unit has been described, it will be readily appreciated that many other conventional structures providing for vertical and horizontal adjustable motion of the aligning screen to center it in relation to the lamp 7 may equally be provided.

The lamp mounting 13 for the lamp 7 is then adjusted vertically and transversely relative to the adjacent structure of the automobile until an image 45 produced by the aligning beam 22 on the screen is located in predetermined relation to the vertical and horizontal center lines 36 and 38 of the aligning screen. The positional relationship between the aligning screen and the locating marks 4 and 6 for the automobile is such that when the image 45 produced by the aligning beam 22 occupies the predetermined location on the aligning screen 32, then the high intensity zone 18 of the main beam 10 is aligned along a path which would place it at the desired predetermined location 18 on the hypothetical screen 12 of the standard screen placed at 25 feet.

It will be appreciated that many advantages flow from the system described. In particular, the amount of equipment required by the service station is only a screen and supporting stand, thereby effecting significant capital economies for service stations having a low volume of head light testing work. Significantly, the short distance of convergence of the aligning beam provides a very much sharper and less diffuse image to be moved across the aligning screen so that an operator working by visual observation may more easily locate the image in the desired location. In addition, the much smaller focusing distance provides for an installation that requires considerably less overall space to be occupied at the service station, thus increasing the amount of space available for other service station activities. It will also be appreciated that the system is also particularly simple to operate.

It will be realized that one key aspect of the invention resides in the manner in which the aligning beam 22, produced by modification of the lamp 7 subsequent to its manufacture, is precisely aligned with the axis of the main beam 10. The converging lens 24 is secured to the surface of the front glass 12 after the lamp has been manufactured and it is therefore necessary that the opening 30 should not be provided until the lens 24 has been secured if the opening 30 is to be located at the precise position relative to the lens 24 for the aligning beam 22 to have its axis Y—Y aligned with the axis X—X of the main beam. However, the barrier 11 is positioned within the sealed portion of the lamp unit so that it cannot be reached directly for mechanical production of the opening 30 therein at the desired location. Furthermore, the opening 30 cannot be preprovided in an early stage of manufacture of the lamp as at that time it is not known precisely what relative position the converging lens 24 will later occupy on the front glass 12.

To resolve this problem, the present invention provides a method of manufacture involving the use of a high energy beam of radiated energy to perforate the barrier 11 to produce the opening 30. For this purpose, the lamp 7 (FIG. 3) is placed before a laser beam source 50 after the converging lens 24 has been secured to the front glass 12. Details of the particular laser beam source employed do not form a part of the present invention as commercially available laser beam units of varying types may readily be obtained. However, any suitable laser beam source adapted to produce a narrow laser beam of coherent parallel light rays at high intensity either pulsed or continuous, may be utilized.

The relative positions of the lamp 7 and the source 50 are such that the source 50, when activated, directs a laser beam 51 in a reverse direction along the main axis X—X of the lamp. The laser beam is extremely narrow and passes back through a central portion of the lens 24 substantially without optical modification thereby and impinges upon the barrier 11 with sufficient intensity to burn or melt a pin point aperture extending through the barrier to define the aperture 30. It will be realized that a beam of parallel light passing through the lens 24 would be converged by the lens to the focal point thereof and that, as previously discussed, the barrier is spaced rearwardly of this focal point. However, by using a laser beam which is extremely narrow it is possible to cause the beam to pass only through the central part of the lens where the curvature is least, so that optical distortion of the laser beam in its passage through the lens is kept to a minimum level insufficient to degrade the penetrating power of the laser beam below that necessary to perforate the barrier. Thereafter, the aperture functions as the target for the converging lens 24 in the manner previously described.

It will be appreciated that the use of the laser beam in this way enables the interior optical structure of the head lamp to be modified to provide the aligning beam in correct relation to the main beam, without requiring access to the interior of the sealed beam unit.

SUMMARY OF ADVANTAGES

It will be appreciated that in utilizing the lamp aiming system of the present invention, certain significant advantages are provided.

In particular, the system requires a testing installation such as a service station to invest only in a very simple and low-cost testing equipment in the form of the aligning screen. Furthermore, the simplicity of the aligning process utilizing the screen is such that the services of highly trained personnel are not required to operate it.

In addition, the use of the converging lens having a short focal length provides a relatively bright aligning image which may more readily be moved to its desired predetermined location by visual observation.

The method of providing the aligning beam is also particularly advantageous in that it is so devised as to relate the aligning beam for each lamp to the particular optical properties of each lamp modified.

Specifically, the use of a laser beam for modifying the optical structure of the lamp is very advantageous as it permits modification of the lamp to be effected without requiring direct access to the interior of the lamp unit.

We claim:

1. A method of aligning a lamp which is adjustably mounted on lamp supporting structure so as to aim a directional, main beam of light projected by the lamp along a desired predetermined path from the lamp supporting structure, the main beam being of the type diverging gradually along a main beam axis, the method comprising the steps of:

permanently connecting a converging lens with the lamp to extend into the beam to focus a minor portion of the light rays in the main beam into an aligning beam positioned within the main beam at a predetermined relative inclination thereto, arranging the focal length of the converging lens to be sufficiently short to cause the aligning beam to focus to a point spaced close to the lamp, positioning the lamp supporting structure before a screen with the lamp spaced from the screen by a distance generally equal to the distance of convergence of the aligning beam to cause an image to be projected thereby on the aligning screen, arranging the screen and the lamp supporting structure in such relation that when the image occupies a predetermined location on the screen, the main beam will be aimed along the predetermined desired path, and moving the lamp on, and relative to, the lamp supporting structure to move the image to the predetermined location on the screen.

2. A method of constructing a directional light installation capable of being aimed, the method comprising the steps of:

providing a lamp including a light source spaced forwardly of a directional reflector shaped to reflect light from the source in a main beam extending along a main beam axis and including a light transmitting front surface, fixedly and directly securing a converging lens with the light transmitting front surface of the lamp, with the converging lens being spaced forwardly of the light source in position to be centrally intersected by the main beam axis, fixedly connecting a thin, opaque barrier with the lamp to prevent direct passage of light between the light source and the converging lens, directing a beam of directional, radiated energy in a reverse direction along a path aligned with the main beam axis to pass through a central portion of the converging lens and impinge with sufficient intensity upon the barrier to produce a pin point opening therethrough; and thereafter utilizing the pin point opening as a target for the converging lens to produce an image on an aiming screen which may be utilized for aligning the main beam along a predetermined path.

3. A method as defined in claim 2 wherein the step of directing a beam of radiated energy includes the further steps of:

aligning a laser beam source with the main beam axis, utilizing the laser beam source to direct a narrow, high energy laser beam of coherent parallel light rays back along through a central median portion of the converging lens to pass therethrough and impinge upon the barrier with sufficient intensity to produce the pin point opening therein.

4. In an installation for aligning a lamp with supporting structure so as to aim a directional, main beam of light projected by the lamp along a desired predetermined path from the structure, the lamp being of the type including, a lamp housing movably connected with the supporting structure, a light source and a directional reflector for reflecting light from the source as the main beam diverging gradually along a main beam axis, a combination comprising:

converging lens means permanently connected with the lamp housing to extend into the main beam to focus a minor portion of the light rays in the main beam into an aligning beam within the main beam at a predetermined relative inclination thereto, said converging lens means having a focal length sufficiently short to cause the aligning beam to converge to a point spaced close to the lamp, an aligning screen positioned generally adjacent the point of focus of the aligning beam and receiving an image produced by the aligning beam; and means to connect the supporting structure with said aligning screen in such relation that when the aligning beam image occupies a predetermined location on said screen, the main beam is aimed along the desired predetermined path relative to the structure, whereby the lamp housing may be moved relative to the supporting structure to bring the aligning beam image to the predetermined location on the aligning screen to thereby cause the main beam to be aligned along the predetermined desired path.

References Cited

UNITED STATES PATENTS 2,111,580  3/1938  Arbuckle.
2,162,010  6/1939  Graham.

RONALD L. WIBERT, Primary Examiner

J. ROTHENBERG, Assistant Examiner

U.S. Cl. X.R.

240—413